Nov. 7, 1944.  A. RINGZELLI  2,362,306
GRINDING GAUGE OR HOLDER FOR THREAD CUTTING TOOLS
Filed Sept. 24, 1942
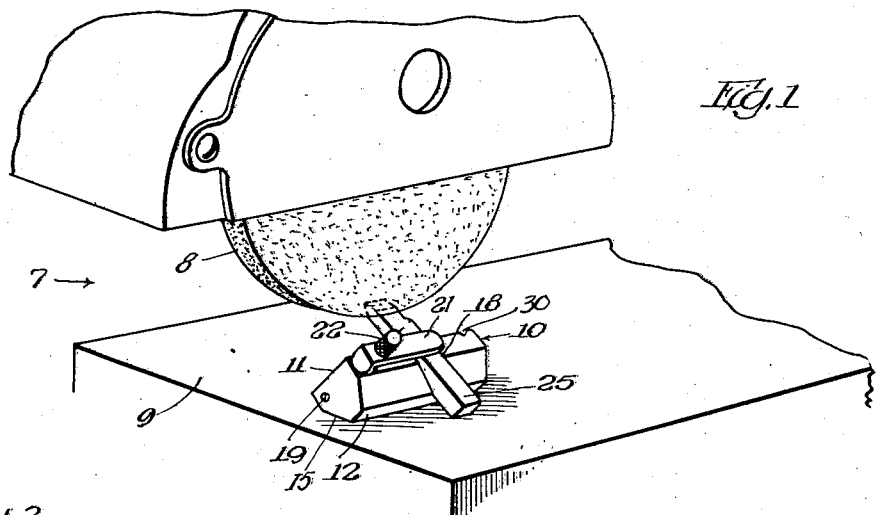
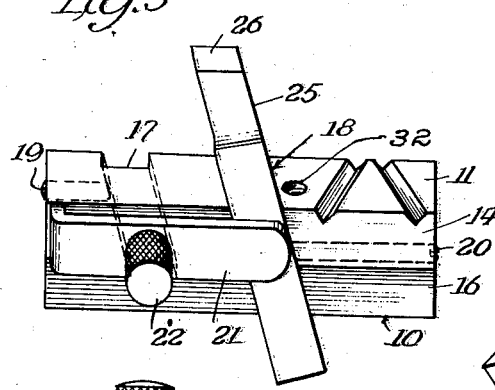
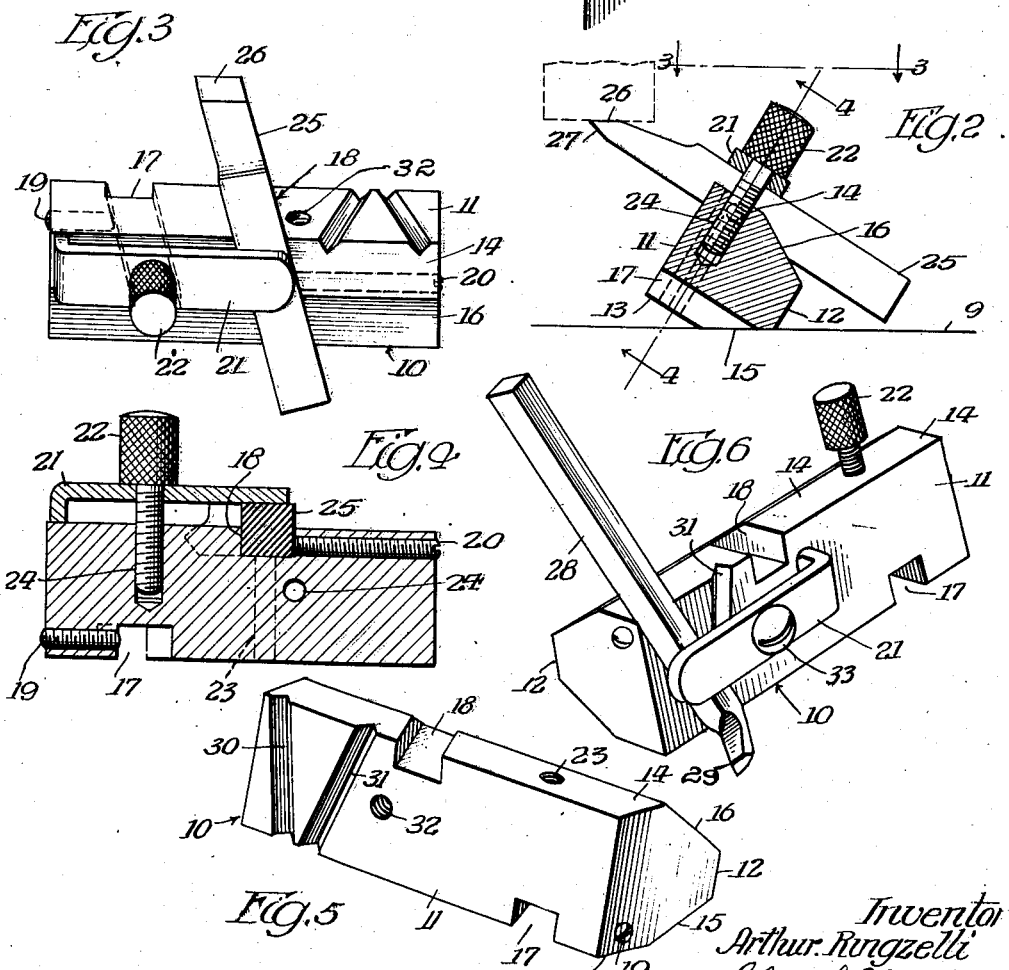
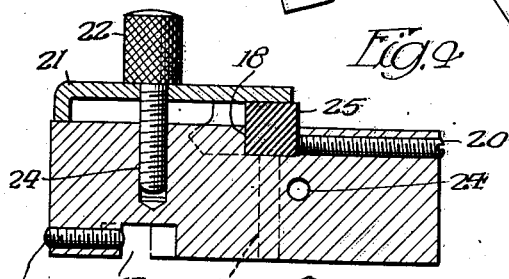
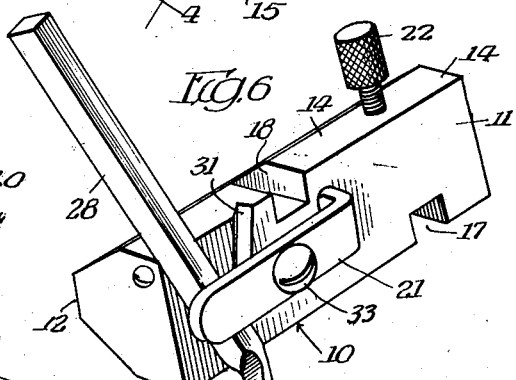
Inventor
Arthur Ringzelli
By Glenn S. Noble
Atty Patented Nov. 7, 1944

2,362,306

UNITED STATES PATENT OFFICE 2,362,306

GRINDING GAUGE OR HOLDER FOR THREAD-CUTTING TOOLS

Arthur Ringzelli, Chicago, Ill.

Application September 24, 1942, Serial No. 459,528

8 Claims. (Cl. 51—221)

This invention relates to devices known as gauges, fixtures, or jigs for holding thread cutting tools for grinding. The cutting ends of such tools or tool bits are ground at predetermined angles depending upon the thread which is to be cut. For instance, United States standard V-threads have an angle of 60° and the sides of the cutting end of the tool should be accurately ground to provide such angle. The end of the tool is also relieved to give the desired clearance or rake, all of which is well known in the tool making art, and for convenience, the present device is shown as adapted for holding a tool for making United States standard V-threads.

The objects of this invention are to provide an improved gauge or holder for grinding tools which will be exceedingly simple in construction and durable and efficient in use; to provide a holder whereby such tools may be accurately ground by an inexperienced person; to provide a tool holder for grinding threading tools which will serve as a master grinding gauge whereby the tools may be accurately ground in the first instance, and may be sharpened to the required degree of accuracy; to provide means whereby an inexperienced person may grind thread cutting tools in the correct manner equaling or surpassing the accuracy of the finest skilled mechanic; to provide a jig or holder for grinding external thread cutting tools, and also internal thread cutting tools; and to provide such other advantages and improvements as will be described more fully in the following description.

In the accompanying drawing illustrating this invention,

Fig. 1 is a perspective view showing the use of the holder for grinding a tool on a surface grinder;

Fig. 2 is a cross sectional view of the gauge showing the same in position in the grinder;

Fig. 3 is a plan view of the gauge or holder taken substantially on the line 3—3 of Fig. 2;

Fig. 4 is a sectional view taken substantially on the line 4—4 of Fig. 2;

Fig. 5 is a perspective particularly showing the face of the gauge having the grooves and clamping means for holding an internal thread cutting tool; and Fig. 6 is a perspective view showing the positioning of the internal thread cutting tool in the gauge.

As shown in this drawing, 7 indicates a grinder of any suitable type as, for instance, a surface grinder having a grinding wheel 8 and a reciprocating bed 9 which is preferably provided with a magnetic chuck for holding the work piece thereon. My improved gauge or jig has a main block or body portion 10 having parallel faces 11 and 12 and parallel sides 13 and 14. Portions of the sides are also beveled transversely of the block to provide faces or supporting surfaces 15 and 16 which in the present instance are arranged at an angle of 60° to each other as shown. The sides 13 and 14 have slots 17 and 18 which are substantially parallel to each other but which are at any desired angle to the sides to provide correct grinding angles for the opposing surfaces of the tool. It will also be noted that the bottoms of the slots are parallel to the sides of the gauge. Set screws 19 and 20 are provided for clamping or holding the tool in the respective slots. The gauge is also provided with a clamp 21 and set screw or clamping screw 22 with a knurled head for holding the tool in the various slots, threaded holes 23 and 24 being provided for receiving the screw to hold the clamp in fastening positions adjacent to the slots 17 and 18.

When a tool for grinding external threads, such as the tool 25 is to be sharpened, it may first be placed in the slot 18 as shown and the set screw 20 tightened to hold it firmly against the side of the slot. It is then clamped securely in position by the clamp 18 preparatory for grinding. The gauge or jig may then be placed on the bed or table 9 and will be held automatically by the magnetic action. The gauge is positioned so that it will move longitudinally with the movement of the table with the beveled face 15 in contact with the bed. This will hold the tool 25 substantially in the position shown in Figs. 1 and 2 with one of the surfaces or sides 26 of the cutting point to be engaged by the grinding wheel 8 to grind such side at the desired angle. After this side has been ground, the tool is then clamped in a similar manner in the slot 17 and the gauge is then turned over so that the beveled side 16 will rest on the table and the other side or surface 27 of the grinding point may be ground as described which will give the desired angle of 60° between the surfaces 26 and 27 and the point will also have the necessary or desired rake as shown.

The gauge or jig is also adapted for accurately grinding the tools for cutting internal thread such as the tool shown at 28 which have their cutting portions 29 at substantially right angles to the shank. These tools may be made from either round or square stock with their cutting points formed in any well known manner. The gauge or block 10 is provided on the side 11 with converging grooves 30 and 31 for receiving the shank of the tool 28. These grooves are positioned at substantially 30° to each other or 15° from the side of the block which will serve to hold the tool 28 in proper position for grinding its cutting point. A threaded hole 32 is positioned adjacent to the groove 31 and serves to receive a screw 33 which coacts with the clamp 21 for holding the tool securely in position. When the jig or fixture is used for grinding such tools, it is positioned on the bed as shown in Fig. 6 and a screw with a small head is used so that there is no danger of its coming in contact with the grinding wheel. The use of the device for grinding such tools or bits for internal threads will be readily understood by those familiar with such shop practice.

The gauge or jig is preferably made of hardened tool steel and accurately ground or finished in order to provide for the accurate grinding of the tools, and also to give the same long life. There are no small or delicate parts to get out of order and no adjustments to be made so that accurate grinding may be done by inexperienced persons.

While I have described the gauge or jig as being applied to a magnetic chuck, it will be apparent that it may also be used by moving the same manually on the bed, provision being made to bring the point into contact with the grinding wheel, or if desired, any suitable guideways (not shown) may be utilized for supporting and guiding the movement of the gauge.

It will also be noted that changes may be made in the shape of the parts or construction of the same in order to hold different forms of tools, and therefore I do not wish to be limited to the particular construction shown and described except as set forth in the following claims in which I claim:

1. A new article of manufacture comprising a gauge for grinding thread cutting tools, consisting of an elongated block of substantially rectangular cross section with the exception that two opposite sides have portions which converge at approximately 30° to the center plane of the block, each of the latter sides having a substantially transverse slot therein for receiving the tool to be ground, said slots being parallel to each other and at an angle to the length of the block corresponding to the desired rake of the cutting end of the tool to be sharpened, and means for holding the tool in said slots.

2. A gauge or jig for sharpening thread cutting tools, comprising an elongated block having portions of the sides converging for engagement with the table of a surface grinder and having slots 17 and 18 in the respective sides having the converging portions and positioned at an angle to the sides, the bottoms of the slots being substantially parallel to the sides whereby a tool held in either slot will be presented to the grinding wheel at the right angle for grinding the cutting edge when the converging portion of the other side of the block is resting on the table, set screws in the block for engagement with tools when placed in the slots and clamping means for clamping the tools in the slots.

3. A holder for the purposes set forth consisting of a block of substantially rectangular cross section, but having portions of the top and bottom converging toward one of the sides to provide oppositely disposed faces for engagement with the bed of a grinding machine, slots in the top and bottom which are parallel with each other and arranged at an angle to the sides of the block, set screws for holding the tools to be sharpened against the sides of the slots, and clamping means for holding the tool in the respective slots, the arrangement being such that when the block is supported on one of the converging sides, the end of a tool held in the slot on the upper side of the block will be presented to the grinding wheel at a desired angle and when the block is reversed and the tool supported in the slot on the opposite side, the end of the tool will be supported in position to grind the opposite face of the cutting portion of the tool.

4. A compound gauge or jig for supporting both external and internal thread cutting tools, having slots in the opposite sides for receiving a tool for cutting external threads, means for holding the tool in the slots, portions of the said opposite sides of the block being beveled to engage with the table of a surface grinder, the arrangement being such that a tool placed first in one of the slots and ground and then in the opposite slot and ground, will be held securely in position for accurately grinding the opposite faces of the cutting point of the tool, said block also having converging grooves on one face 11 which is not beveled, for supporting a tool for cutting internal threads having a shank with a cutting portion at substantially right angles thereto, and means for clamping the last named tool in said grooves, the arrangement being such that the sides of the cutting point of the tool will be presented at the proper angle to be ground when the gauge and tool are mounted in operative position on a surface grinder.

5. A holder for holding tool bits to be ground, comprising a body having means on opposite sides thereof for supporting the tool bits, and having converging surfaces on said opposite sides adapted to support the holder in alternate positions on the bed of a surface grinder to present a tool bit for grinding whereby opposite sides of the bit will be ground at the desired angle corresponding to the relative positions of the converging surfaces.

6. A grinding jig for grinding thread cutters, comprising a body having grooves and clamping means on the top and bottom faces thereof for holding a thread cutter in predetermined positions with respect to the body, said body having converging surfaces on the top and bottom faces serving to support the body in positions on the bed of a surface grinder for presenting the cutting end of a tool to the grinder for grinding inclined surfaces thereon, substantially as described.

7. A new article of manufacture comprising a tool grinding jig having a body with converging sides adapted to hold the body on the bed of a surface grinder at predetermined angles with respect to the grinder, said body having means coacting with the top and bottom faces for holding a tool for cutting external threads, and having means on the side opposite the converging faces for holding a tool for cutting internal threads, the arrangement being such that when a tool is held in the jig on the bed of a surface grinder, its cutting end will be held in proper position for accurate grinding.

8. A gauge for use in grinding thread cutting tools on a surface grinder, comprising a block of substantially rectangular cross section with the exception that two opposite sides have portions which converge at a predetermined angle to the center plane of the block, each of said opposite sides having a substantially transverse slot therein for receiving the tool to be ground, said slots being parallel to each other, and at an angle to the length of the block corresponding to the desired rake of the cutting end of the tool to be sharpened, and means for holding the tool in the respective slots.

ARTHUR RINGZELLI.